US008074901B2

(12) United States Patent
Cotler

(10) Patent No.: US 8,074,901 B2
(45) Date of Patent: Dec. 13, 2011

(54) LUBRICATOR NOZZLE AND EMITTER ELEMENT

(75) Inventor: Elliot M. Cotler, Brooklyn, NY (US)

(73) Assignee: Uniwave, Inc., Charlotte, NC (US)

( * ) Notice: Subject to any disclaimer, the term of this patent is extended or adjusted under 35 U.S.C. 154(b) by 213 days.

(21) Appl. No.: 11/291,736

(22) Filed: Dec. 1, 2005

(65) Prior Publication Data

US 2007/0125883 A1 Jun. 7, 2007

(51) Int. Cl.
*B05B 1/34* (2006.01)
*B05B 1/26* (2006.01)
*B05B 1/14* (2006.01)

(52) U.S. Cl. ........ 239/474; 239/473; 239/475; 239/488; 239/590.5; 239/489; 239/501

(58) Field of Classification Search .................. 239/474, 239/473, 475, 488, 590.5, 489, 487, 590, 239/501, 403, 432, 472, 491, 396; 184/6.26; 408/230; 222/145.6, 459; 366/96, 164.4, 366/181.5, 336, 340
See application file for complete search history.

(56) References Cited

U.S. PATENT DOCUMENTS

| | | | | | |
|---|---|---|---|---|---|
| 436,558 | A | * | 9/1890 | Buckingham | 175/227 |
| 579,371 | A | * | 3/1897 | Watson | 239/475 |
| 746,525 | A | * | 12/1903 | Knobbs | 431/183 |
| 1,022,135 | A | * | 4/1912 | Heinkel | 408/230 |
| 1,129,970 | A | * | 3/1915 | Farr | 137/242 |
| 1,191,621 | A | * | 7/1916 | Schmidt | 239/487 |
| 1,320,985 | A | * | 11/1919 | Brightman | 408/230 |
| 1,462,361 | A | * | 7/1923 | Blackwood | 138/42 |
| 1,549,537 | A | * | 8/1925 | Hansen | 239/501 |
| 2,011,833 | A | * | 8/1935 | Sorg | 123/196 M |
| 2,013,120 | A | * | 9/1935 | Wellcome | 184/6.5 |
| 2,110,365 | A | * | 3/1938 | Imfeld | 239/474 |
| 2,379,944 | A | * | 7/1945 | Willmott | 408/46 |
| 2,391,396 | A | * | 12/1945 | Denison | 408/230 |
| 2,404,048 | A | * | 7/1946 | Gepfert | 408/228 |
| 2,553,130 | A | * | 5/1951 | Cadella | 239/473 |
| 2,612,407 | A | * | 9/1952 | Bete | 239/501 |
| 2,659,427 | A | * | 11/1953 | Bither | 239/475 |
| 2,769,355 | A | * | 11/1956 | Crisp | 408/230 |
| 2,804,341 | A | * | 8/1957 | Bete | 239/501 |
| 2,840,185 | A | * | 6/1958 | Norgren | 239/467 |
| 2,965,271 | A | * | 12/1960 | Soffer et al. | 222/542 |
| 2,984,421 | A | * | 5/1961 | Hession, Jr. | 239/402.5 |
| 3,008,652 | A | * | 11/1961 | McLean | 239/439 |
| 3,191,718 | A | * | 6/1965 | Haywood | 184/109 |
| 3,213,919 | A | * | 10/1965 | Calzolari | 239/488 |
| 3,785,560 | A | * | 1/1974 | Hruby, Jr. | 239/17 |

(Continued)

FOREIGN PATENT DOCUMENTS

FR 2547644 A1 * 12/1984

*Primary Examiner* — Len Tran
*Assistant Examiner* — Steven M Cernoch
(74) *Attorney, Agent, or Firm* — Ladas & Parry LLP

(57) ABSTRACT

A nozzle for a mist lubricator system has an emitter head located in a tubular housing. The emitter head has tapered passageways terminating at an end from which lubricant drops are directed to a target to be lubricated. The emitter head can be incorporated in lubricator systems of various types, including those utilizing a cycling feed metering system. A nozzle constructed in accordance with the present invention can be used in reduced airflow systems and exhibits substantially lessened lubricant loss during low and no airflow periods.

13 Claims, 3 Drawing Sheets

U.S. PATENT DOCUMENTS

| | | | | | |
|---|---|---|---|---|---|
| 4,365,758 | A | * | 12/1982 | Schaming | 239/590 |
| 4,483,417 | A | * | 11/1984 | Mann | 184/55.2 |
| 4,514,291 | A | * | 4/1985 | McGarry et al. | 209/166 |
| 4,515,314 | A | * | 5/1985 | Currall | 239/466 |
| 5,058,809 | A | * | 10/1991 | Carroll et al. | 239/428.5 |
| 5,064,456 | A | * | 11/1991 | Gantzer | 55/385.1 |
| 5,160,232 | A | * | 11/1992 | Maier | 408/223 |
| 5,240,183 | A | * | 8/1993 | Bedaw et al. | 239/403 |
| 5,340,273 | A | * | 8/1994 | Rockwood | 415/113 |
| 5,350,039 | A | * | 9/1994 | Voss et al. | 184/6.16 |
| 5,639,028 | A | * | 6/1997 | Kotlyar | 239/474 |
| 5,639,029 | A | * | 6/1997 | Sundholm | 239/488 |
| 5,853,129 | A | * | 12/1998 | Spitz | 239/456 |
| 6,010,330 | A | * | 1/2000 | Helton et al. | 431/160 |
| 6,289,677 | B1 | * | 9/2001 | Prociw et al. | 60/748 |
| 7,337,879 | B2 | * | 3/2008 | Jager et al. | 184/6.26 |
| 2003/0000773 | A1 | * | 1/2003 | Engler et al. | 184/6.26 |
| 2005/0051642 | A1 | * | 3/2005 | Negoro | 239/488 |

* cited by examiner

LUBRICATOR NOZZLE AND EMITTER ELEMENT

The present invention relates to a new and improved nozzle for a lubrication apparatus and to an emitter element therefor.

BACKGROUND OF THE INVENTION

The provision of lubrication to a particular location in an apparatus, such as a knitting machine, loom, or the like, is often required. Such lubrication is often provided by a lubricant mist directed towards the targeted area, but the stream is often difficult to direct with accuracy. The lubricant provided by a mist system also often coagulates into drops of various sizes. The presence of a spray of drops having a range of sizes impedes control over the amount of lubricant dispersed and its accurate delivery. Other systems dispense a pulsed series of lubricant "slugs" or drops of varying size.

In U.S. Pat. No. 5,639,028 to the present inventor and assignee, an improved nozzle apparatus for use in lubricant mist systems is disclosed. The nozzle set forth therein generates a lubricant stream of small, consistently sized drops that can be accurately directed to a part to be lubricated. Dripping from the nozzle is substantially eliminated, and the nozzle can be used over a wide range of air pressures, including reduced airflow lubrication systems of the aerosol type.

Mist generator systems in which the nozzle of the '028 Patent are employed may have a plurality of nozzles connected to a single generator, with the number of nozzles approaching 30 in number. With increasing energy costs, the cost of providing compressed air to such a plurality of nozzles can be a considerable operational expense. While limiting the amount of air passing through the nozzle would appear to be an obvious solution to such increasing costs, insufficient extraction of lubricant from the aerosol can occur as the air pressure is lowered, leading to excessive lubricant loss and thus mitigating the value of the nozzle apparatus.

The cycling of air through a plurality of nozzles can also conserve the amount of air required. U.S. Pat. No. 6,571,918 discloses a lubricant distributor that meters lubricant into precise individual volume amounts and directs individual volumes to a distribution and spray system. Such cycling systems can lessen air costs, but can lead to lubricant accumulation and run-off through a nozzle when the airflow is either off or below the designed operational threshold pressure for the nozzle. Such run-off results in lubricant loss as well as insufficient lubrication for the targeted area.

It is accordingly a purpose of the present invention to provide a new and improved nozzle assembly particularly adapted for use in reduced airflow situations in oil mist lubrication systems of the type disclosed in the '028 Patent.

A further purpose of the present invention is to provide a nozzle of the general type disclosed in the '028 Patent in which lubricant loss is substantially lessened, if not eliminated, during low airflow and no airflow periods.

Yet a further purpose of the present invention is to provide an emitter head for mist lubrication nozzles, such as those of the type set forth in the '028 Patent, that allows the nozzle to meet the aforementioned purposes and goals.

Yet a further purpose of the present invention is to provide a nozzle and emitter head which are of simple and economical construction, and which can be used in connection with existing lubricator equipment, including those of the type utilizing a cycling feed-type metering system, such as set forth in U.S. Pat. No. 6,571,918.

BRIEF DESCRIPTION OF THE INVENTION

In accordance with the above and other objects and purposes, a nozzle in accordance with the present invention has a tubular housing having an emitter head that converts a sheet-like flow of lubricant into a series of lubricant drops that are directed to a lubricant target by an accompanying carrier gas flow. The emitter head has one or more passageways along which the lubricant and carrier gas flow. The passageways are of a tapered configuration, having a wide width entrance area to effect efficient collection of the lubricant and carrier gas, and an exitway of narrowed size, allowing the lubricant to be delivered to a needle-like end at the head where the drops are formed and from which the drops are propelled to the target by the carrier gas in the form of a series of consistently-sized drops.

BRIEF DESCRIPTION OF THE DRAWINGS

A fuller understanding of the present invention will be obtained upon consideration of the following detailed description of a preferred, but nonetheless illustrative embodiment thereof, when review in conjunction with the annexed drawings, wherein.

DETAILED DESCRIPTION OF THE INVENTION

Figure 5:
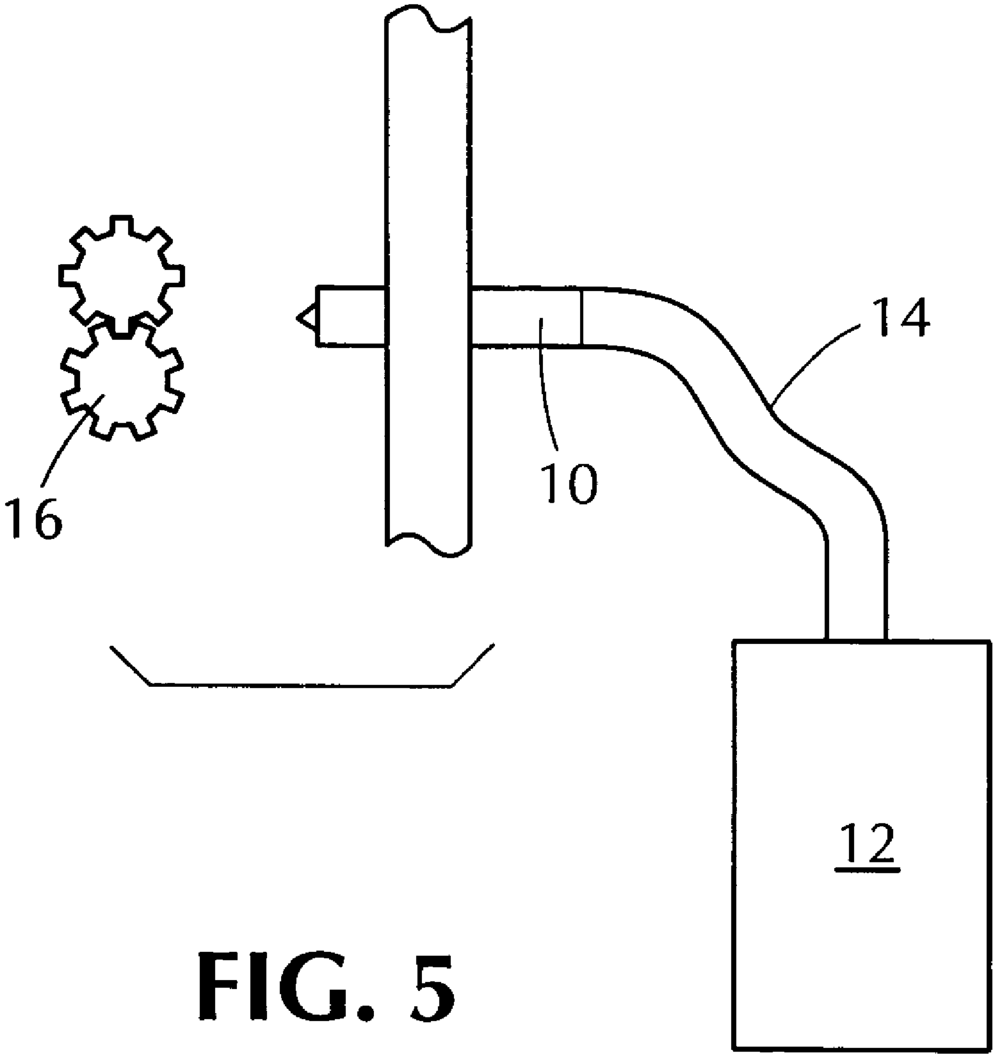
FIG. 5 is a schematic presentation of a mist lubrication system in which the present invention can be used.

With initial reference to FIG. 5, in accordance with the teachings of U.S. Pat. No. 5,639,028, the contents of which are incorporated herein by reference, nozzle 10 of the present invention may comprise a part of an oil mist lubrication system. Such a system typically includes an oil mist source 12 connected to the nozzle 10 by means of a flexible mist transporting tube 14. The nozzle 10 is mounted in an appropriate support structure, and is positioned to direct its oil droplet output towards an intended portion of a machine to be lubricated, as illustrated by the mechanism 16.

Figure 1:
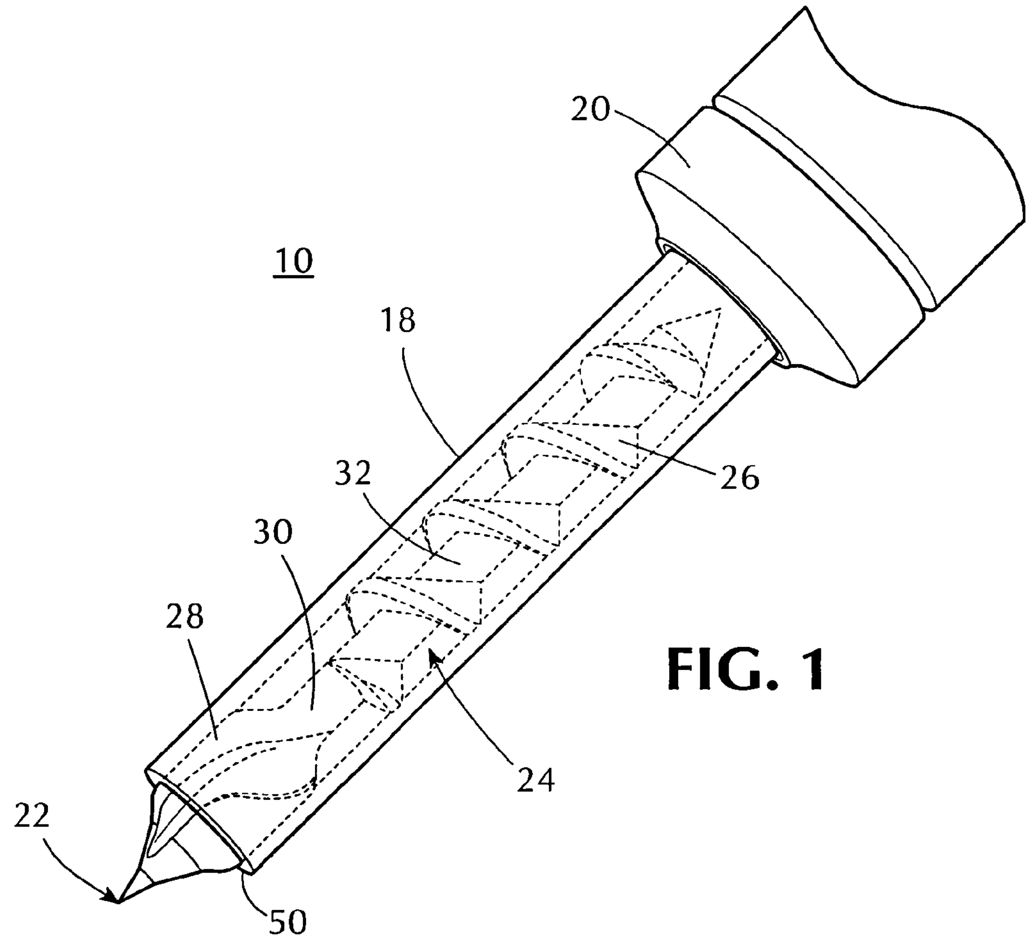
FIG. 1 is a perspective view of a lubrication nozzle incorporating the present invention, an inner core having the inventive emitter head being shown in phantom.

As seen in FIG. 1, the nozzle 10 may comprise an outer tubular sleeve or housing 18, typically formed of a plastic, with a core element 24, typically of brass, mounted in the housing. The housing may be joined at a first end to a coupling 20, which joins the nozzle to a pipe or hose from the oil mist source 12. The oil mist or aerosol enters the nozzle through coupling 20, the nozzle extracting the lubricant from the aerosol and converting it into a series of lubricant drops that form on the needle-like end 22 of nozzle core 24 to be carried by the carrier gas exiting from the nozzle to the intended target.

Figure 2:
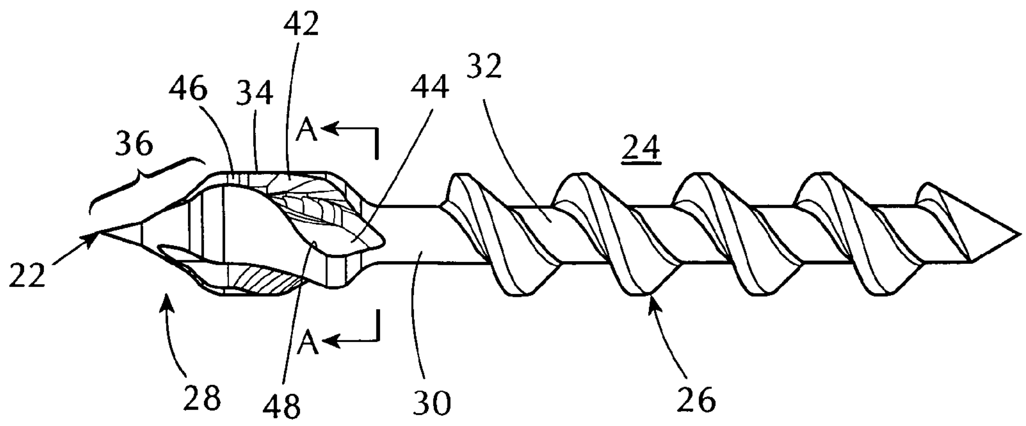
FIG. 2 is an elevation view of the inner core of FIG. 1.

As set forth in the '028 Patent, nozzle core 24 functions as an element for separating suspended oil from the carrier gas and for collecting the separated oil and channeling the oil into the interior of the carrier gas stream exiting from the nozzle. With further reference to FIG. 2, the core includes helical portion 26 joined through neck portion 30 to emitter head 28, which terminates in needle point 22. Helical portion 26 may be formed as a series of thread turns about stem 32. The threads of helical portion 26 engage the inner wall of the housing, as seen in FIG. 1, forming a helical passageway between the core and the inner surface of the housing wall. The helical portion serves as a means for separating oil particles in the supplied oil mist stream from the carrier gas flow. The coalesced droplets collect and flow along the housing wall inner surface to the emitter head 28.

Figure 4:
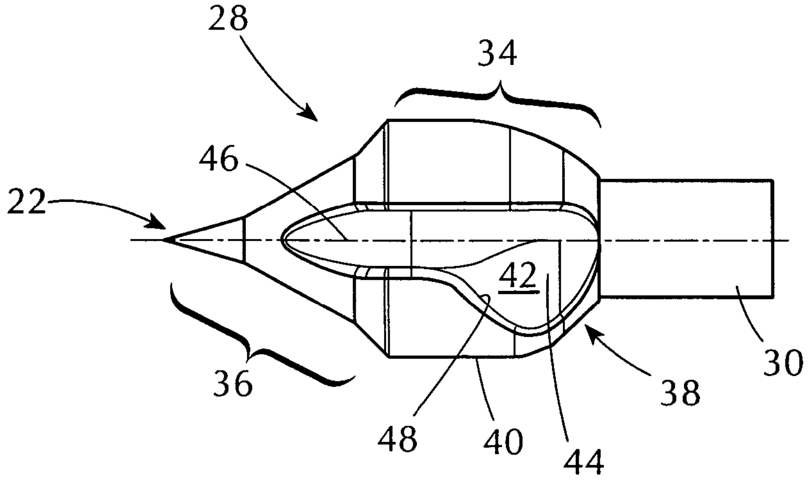
FIG. 4 is a detail view of the emitter head of the invention.

The emitter head 28, further detailed in FIG. 4, may have a main, generally cylindrical body portion 34 and a generally conical exit portion 36 terminating in needle 22. The main body portion may also be tapered at its leading end 38 to form a smoother transition from neck 30. The outer surface 40 of the main body is in contact with the inner surface of housing 18. One or more grooves 42 are formed in the head, forming lubricant/gas passageways between the head and the housing. Each passageway has a relatively wide entranceway 44, tapering into central/exit portion 46. In a nozzle with a main body portion diameter of 0.064 inch and a neck diameter of 0.030 inch the central/exit groove portion may have a width of 0.015 inch.

As seen in FIG. 4, the central/exit groove portion 46 may extend along the main axis of the emitter head and nozzle core, which is normally co-axial with the main longitudinal axis of the nozzle.

Figure 3A:
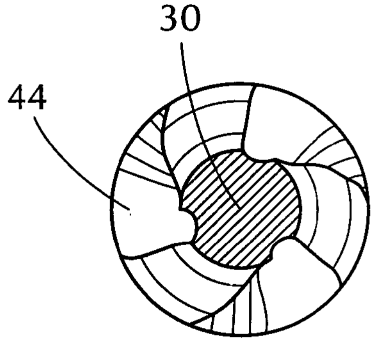
FIG. 3A is a section view taken along line A-A in FIG. 2.
Figure 3B:
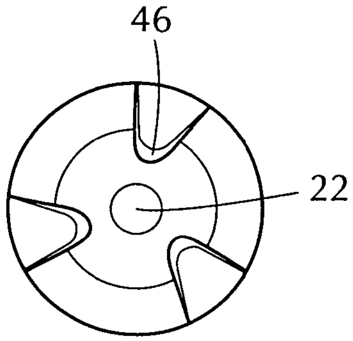
FIG. 3B is an elevation view taken from the left end of FIG. 2.

The entranceway 44 is offset from the central/exit portion 46 of the passageway, with an asymmetrical inwardly tapering cross section, tapering inward from a widened mouth to the central/exit portion of the passageway by way of helical wall surface 48. The helical wall surface preferably has the same rotational sense as the helical portion 26. The bottom of the passageway may be at or slightly below the surface of the neck 30, as seen in FIG. 3A, further dropping or slanting downward towards the needle tip 22 as it passes through exit area 46 of the emitter head, as seen in FIG. 3B. The maximum width and cross-sectional area of the entranceway may be 2 to 3 times the width and cross-sectional area of the central/exit portion.

The passageway grooves may be three in number, located equidistantly about the periphery of the head, with each of the entranceway helical walls being of the same sense as the helix of helical portion 26. The grooves 42, by virtue of their tapering construction, accelerate the gas flow passing through the nozzle, thus providing for more efficient flow of the lubricant sheet along the grooves surfaces and entrainment and transport of the lubricant droplets forming on the needle tip 22 to the intended target. In addition, the helical wall of the entranceway, having the same sense of the helical portion 26, minimizes momentum loss of the gas carrier as it passes into the head, thus improving overall nozzle efficiency.

As the oil reaches the head assembly, it passes from the housing wall onto the facing surface of the main body portion and spreads over the surface of the passageway grooves, continuing to be driven forward along the passageways by the carrier gas. As the passageways exit onto the tapered exit portion 36 of the head, the oil film travels to its needle point 22. It collects there, forming a droplet of growing diameter, until the force exerted upon the droplet by the exiting carrier gas is sufficient to remove it from the point, carrying the droplet with the carrier gas flow to the target to be lubricated.

The passageway grooves have an uneven cross-sectional area, the cross-section of the groove lessening towards the exit edge 50 of the housing 18. This causes any lubricant that remains in that portion of the groove when gas flow is interrupted to be drawn back towards the wider entranceway portion 44 of the groove by surface tension. Thus, nozzle dripping is minimized.

The head construction depicted in FIG. 4 can be machined with a CNC lathe milling head. A construction in which the entranceway is more offset with respect to the central/exit portion of the groove, as generally depicted in FIG. 1 with a pair of opposed helical wall portions, requires more complicated milling procedures, but may have a marginally higher efficiency.

While the embodiments presented in the Figures depicts the emitter head as part of a unitary nozzle core construction including a helical portion 26, it is to be appreciated that other embodiments and adaptations of the invention are possible without departing from the intended scope of the invention, including utilizing the emitter head in a lubrication system in which a discrete element for coagulating lubricant from a mist into a liquid flow is not present, or is separate from an emitter head element. Thus, the present invention may be used in a variety of lubrication systems, including those in which lubricant is distributed in a liquid form using a metering device of U.S. Pat. No. 6,571,918, as well as the constructions depicted in FIGS. 5-7 of U.S. Pat. No. 5,639,028.

I claim:

1. A nozzle for a mist lubricator system comprising:

a tubular housing having a series arrangement of a first helical passageway means with a first end for receipt of a mist flow and an emitter head, the emitter head having passageway means comprising a groove with a central groove portion of a first diameter extending parallel to and along a main axis of the emitter head and terminating at an exit along the main axis and an entranceway portion tapering inwardly towards the central groove joining the central groove portion, the entranceway being asymmetric and oriented asymmetrically with respect to the main axis, offset from the main axis and having an entrance mouth wider than the first diameter, a first wall surface segment extending parallel to the main axis and an opposed helical wall surface segment, the emitter head terminating at an emitter end from which lubricant drops are directed to a target to be lubricated.

2. The nozzle of claim 1, wherein the emitter head passageway means comprise a plurality of parallel passageway portions.

3. The nozzle of claim 1 wherein a core is mounted in the tubular housing, the core comprising the first helical passageway means and the emitter head.

4. The nozzle of claim 1 wherein the first helical passageway means and the helical wall segment are of the same rotational sense.

5. The nozzle of claim 1 wherein the grooves are three in number.

6. In a nozzle of the type comprising a housing having an inlet for an aerosol having a liquid dispersed through a carrier gas flow and an exit, means coupled to said inlet for extracting the liquid from said carrier gas and collecting said liquid, and means for reintroducing said collected liquid into an interior of the carrier gas flow in a manner whereby discrete drops of said liquid are formed and are carried by the gas flow from said exit, an improvement comprising a second passageway means within the housing comprising a groove with a central groove portion of a first diameter extending parallel to and along a main axis of the nozzle and terminating at an exit along the main axis, and an entranceway portion tapering inwardly towards the central groove joining the central groove portion, the entranceway being asymmetric and oriented asymmetrically with respect to the main axis, offset from the main axis and having an entrance mouth wider than the first diameter, a first wall surface segment extending parallel to the main axis and an opposed helical wall surface segment, said second passageway means comprising the means for reintroducing the liquid.

7. The nozzle of claim 6, wherein the second passageway means are formed between an emitter head mounted in the housing and having at least one tapered groove and an inner wall of the housing.

8. The nozzle of claim 7, wherein the grooves are three in number.

9. A nozzle for a mist lubricator system comprising:

a tubular housing;

at least one passageway within a first portion of the housing having a surface for collection in the form of a film of liquid particles removed from a gas carrier as it traverses the passageway; and an emitter head within a second portion of the housing having passageway means comprising at least one groove with a central groove portion of a first diameter extending parallel to and along a main axis of the emitter head and terminating at an exit along the main axis from which lubricant drops formed from the film are directed to a target to be lubricated, and an entranceway portion tapering inwardly towards the central groove joining the central groove portion, the entranceway being asymmetric and oriented asymmetrically with respect to the main axis, offset from the main axis and having an entrance mouth wider than the first diameter, a first wall surface segment extending parallel to the main axis and an opposed helical wall surface segment.

10. The nozzle of claim 9, wherein the emitter head has a generally cylindrical main body portion and a generally conical tip portion, the entranceway being located in the body portion and the exit being located in the tip portion.

11. The nozzle of claim 10 wherein the diameter of the entranceway and the central groove portion are of a ratio of between 2:1 and 3:1.

12. An emitter head for a nozzle of a lubrication system using a compressed gas to drive a lubricant to a target, the emitter head having at least one passageway for collecting lubricant being carried by the gas comprising a groove with a central groove portion of a first diameter extending parallel to and along a main axis of the emitter head and terminating at an exit along the main axis, and an entranceway portion tapering inwardly towards the central groove joining the central groove portion, the entranceway being asymmetric and oriented asymmetrically with respect to the main axis, offset from the main axis and having an entrance mouth wider than the first diameter, a first wall surface segment extending parallel to the main axis and an opposed helical wall surface segment, the passageways terminating at an emitter end from which formed lubricant drops are directed to the target.

13. The emitter head of claim 12, wherein the emitter head has a generally cylindrical main body portion and a generally conical tip portion, the entranceway being located in the body portion and the exit being located in the tip portion.

* * * * *